US009654299B2

(12) United States Patent
Shinde et al.

(10) Patent No.: US 9,654,299 B2
(45) Date of Patent: May 16, 2017

(54) EXECUTION FRAMEWORK FOR POLICY MANAGEMENT

(71) Applicant: ORACLE INTERNATIONAL CORPORATION, Redwood Shores, CA (US)

(72) Inventors: Rahul Shinde, Fremont, CA (US); Tomas Ericson, San Francisco, CA (US); Diwakar Goel, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 880 days.

(21) Appl. No.: 13/622,520

(22) Filed: Sep. 19, 2012

(65) Prior Publication Data
US 2014/0082169 A1 Mar. 20, 2014

(51) Int. Cl.
*H04L 12/14* (2006.01)
*H04L 12/24* (2006.01)
*H04N 21/258* (2011.01)

(52) U.S. Cl.
CPC ...... *H04L 12/1407* (2013.01); *H04L 41/0893* (2013.01); *H04L 41/5022* (2013.01); *H04N 21/25883* (2013.01)

(58) Field of Classification Search
CPC ........................... G06F 15/173; H04L 12/1407
See application file for complete search history.

(56) References Cited

U.S. PATENT DOCUMENTS

| 6,760,417 | B1 | 7/2004 | Wallenius |
| 7,136,913 | B2 | 11/2006 | Linderman |
| 7,483,438 | B2 | 1/2009 | Serghi et al. |
| 8,027,296 | B2 * | 9/2011 | Hu et al. ........................ 370/329 |
| 8,131,831 | B1 * | 3/2012 | Hu .................................. 709/223 |
| 8,296,409 | B2 | 10/2012 | Banerjee et al. |
| 2002/0025795 | A1 | 2/2002 | Sharon et al. |
| 2003/0028790 | A1 | 2/2003 | Bleumer et al. |
| 2004/0009762 | A1 | 1/2004 | Bugiu et al. |
| 2005/0245230 | A1 | 11/2005 | Benco et al. |
| 2007/0106801 | A1 | 5/2007 | Jansson |

(Continued)

OTHER PUBLICATIONS

Bea, WebLogic Network Gatekeeper, Architectural Overview, Version 3.0, 112 pages, Sep. 2007.
(Continued)

*Primary Examiner* — Jerry Dennison
(74) *Attorney, Agent, or Firm* — Tucker Ellis LLP

(57) ABSTRACT

Embodiments of the present invention provide systems and methods of designing and implementing service policies in a telecommunications network. The policy management system includes interfaces operable to receive different subscriber information, an execution framework which includes policies which can be dynamically customized using one or more custom execution blocks, wherein the policies can receive the subscriber information through the interfaces and execute each policy based on the subscriber information. The method enables a network operator to dynamically update policies using customizable execution blocks and thereby change services associated with a particular policy as well as change the input factors (subscriber location, profile, etc.) available to that policy.

20 Claims, 8 Drawing Sheets

(56) References Cited

U.S. PATENT DOCUMENTS

| | | |
|---|---|---|
| 2007/0143470 A1 | 6/2007 | Sylvain |
| 2008/0103923 A1 | 5/2008 | Rieck et al. |
| 2009/0228953 A1* | 9/2009 | Hu et al. .......................... 726/1 |
| 2009/0268715 A1 | 10/2009 | Jansson |
| 2011/0082920 A1 | 4/2011 | Bhattacharya et al. |
| 2012/0084425 A1* | 4/2012 | Riley et al. .................. 709/223 |
| 2012/0110128 A1* | 5/2012 | Aaron et al. ................. 709/219 |
| 2012/0284189 A1* | 11/2012 | Gardella ................ H04L 12/14 705/44 |

OTHER PUBLICATIONS

Chen et al., Applying SOA and Web 2.0 to Telecom: Legacy and IMS Next-Generation Architectures, IEEE, 6 pages, 2008.
Oracle Communication Services Gatekeeper Concepts and Architectural Overview, Release 4.1, Oracle, 94 pages, Jan. 2009.

* cited by examiner

Figure 3A
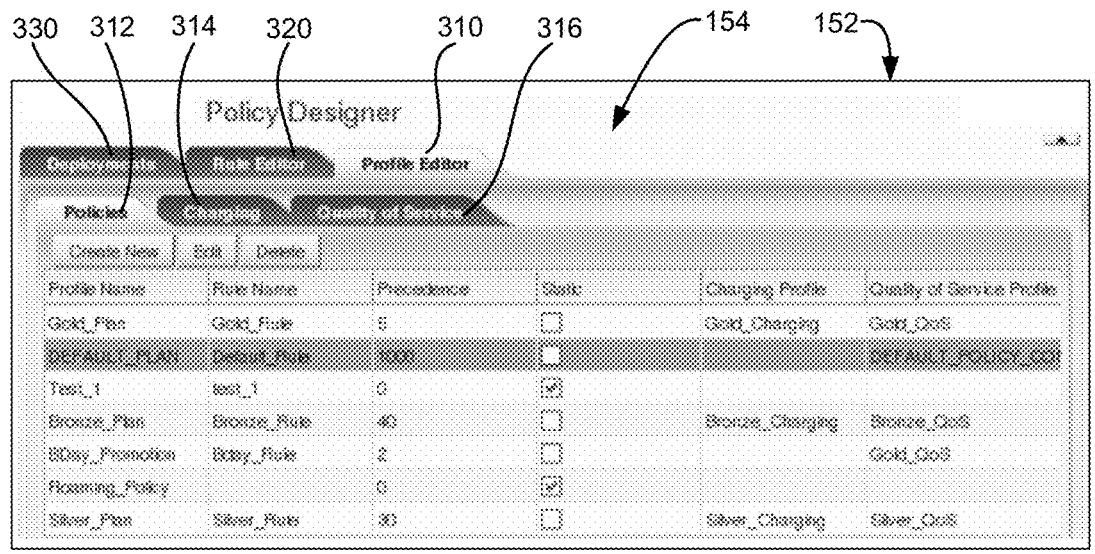
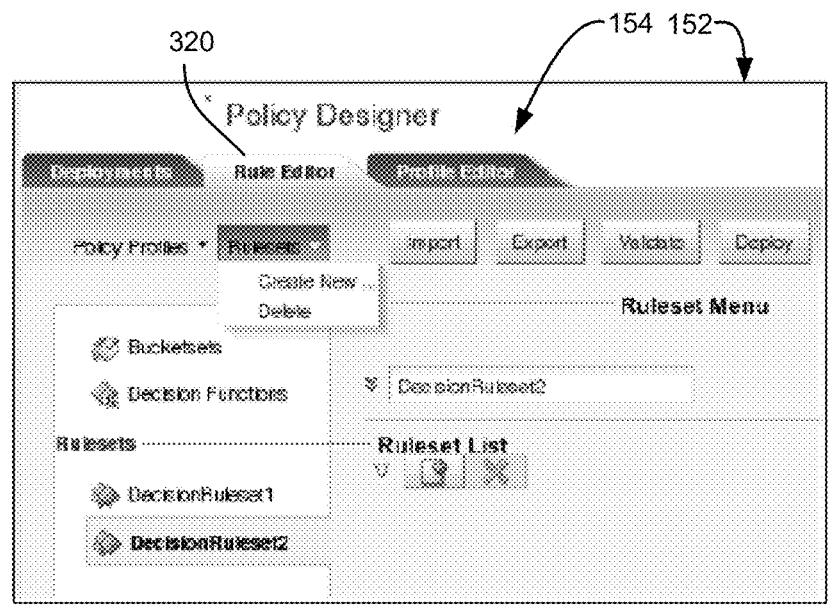
Figure 3B

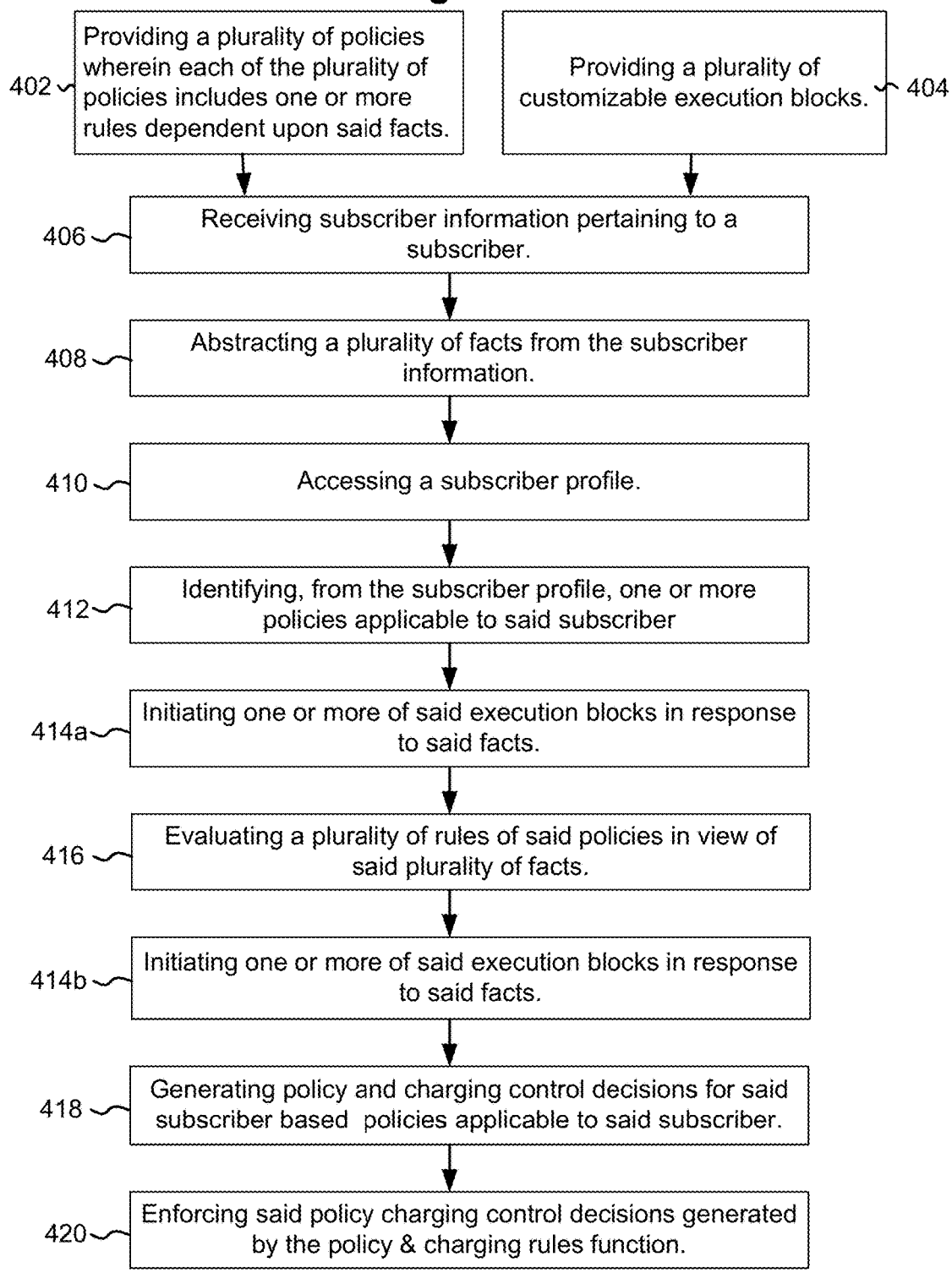

| Gx Parameters 502 | Rule Attribute Name | Value Type | Comments |
|---|---|---|---|
| CC-Request-Type | gxCcRequestType | Enumerated | CCRequestType |
| Subscription-Id | gxSubscriptionIdList | List | |
| Framed-IP-Address | gxFramedIPAddress | String | |
| IP-CAN-Type | gxIPCanType | Enumerated | IPCanType |
| RAT-Type | gxRatType | Enumerated | RATType |
| User-Equipment-Info | gxUserEquipmentInfo | Grouped | |
| - type | type | Enumerated | UserEquipmentInfoType |
| - value | Value | String | |
| 3GPP-SGSN-MCC-MNC | gx3gppSgsnMcc, gx3gppSgsnMnc | String | Split into Two |
| 3GPP-SGSN-Address | gx3gppSgsnAddress | String | |
| 3GPP-User-Location-Info | gx3gppUserLocationInfo | Grouped | |
| - locationType | locationType | Enumerated | GeographicLocationType |
| - CI | CI | Integer | |
| - ECI | ECI | Integer | |
| - LAC | LAC | Integer | |
| - MCC | MCC | Integer | |
| - MNC | MNC | Integer | |
| - RAC | RAC | Integer | |
| - SAC | SAC | Integer | |
| - TAC | TAC | Integer | |
| Called-Station-ID | gxCalledStationId | String | |
| Online | gxOnline | Enumerated | Online |
| Offline | gxOffline | Enumerated | Offline |
| TFT-Packet-Filter-Information | gxTftPacketFilterInformationList | List | PacketFilterInfo |
| Charging-Rule-Report | gxChargingRuleReportList | List | |
| Event-Trigger | gxEventTriggerList | List | EventTrigger |
| Packet-Filter-Information | gxPacketFilterInformationList | List | PacketFilterInfo |
| Packet-Filter-Operation | gxPacketFilterOperation | Enumerated | PacketFilterOperation |
| Network-Request-Support | gxNetworkRequestSupport | Enumerated | NetworkRequestSupport |
| Bearer-Identifier | gxBearerIdentifier | String | |
| Bearer-Operation | gxBearerOperation | Enumerated | BearerOperation |
| Termination-Cause | gxTerminationCause | Enumerated | SessionTerminationCause |
| QoS-Information | gxQosInformation | Grouped | |
| - QoS-Class-Identifier | qosClassIdentifier | Integer | |
| - Max-Requested-Bandwidth-UL | maxRequestedBandwidthUL | Long | |
| - Max-Requested-Bandwidth-DL | maxRequestedBandwidthDL | Long | |
| - Guaranteed-Bitrate-UL | guaranteedBitrateUL | Long | |
| - Guaranteed-Bitrate-DL | guaranteedBitrateDL | Long | |

Figure 5B

510

| Rx Parameters 512 | Rule Attribute Name | Value Type | Comments |
|---|---|---|---|
| AF-Application-Identifier | rxAfApplicationIdentifier | String | |
| Service-Info-Status | rxServiceInfoStatus | Enumeration | ServiceInfoStatus |
| AF-Charging-Identifier | rxAfChargingIdentifier | String | |
| Specific-Action | rxSpecificActionList | List | |
| Subscription-ID | rxSubscriptionIdList | List | |
| Framed-IP-Address | rxFramedIPAddress | String | |
| Called-Station-ID | rxCalledStationId | String | |
| Service-URN | rxServiceUrn | String | |

Figure 5C

520

| Common Parameters 522 | Rule Attribute Name | Value Type | Comments |
|---|---|---|---|
| applicationType | applicationType | Enumerated | Specifies the application type is Gx/Rx ApplicationType. Derived from Application-Id |
| installedPolicyProfileList | installedPolicyProfileList | List | Installed Policy Profiles for the session |
| installedEventTriggerSet | installedEventTriggerSet | List | Installed Event Triggers for the session |
| subscriberProfile | subscriberProfile | Grouped | Subscriber Profile |
| userTimeZoneCalendar | userTimeZoneCalendar | Calendar | Calendar for the timezone the user belongs to. Derived from 3GPP-MS-Timezone |

| Functions 532 | Input | Comments |
|---|---|---|
| FindGxSubscriptionId | in : In,<br>type: SubscriptionIdType<br>data: String | Finds for a given subscriber in the incoming Gx message. "data" contains the Subscription-Id |
| FindRxSubscriptionId | in : In,<br>type: SubscriptionIdType<br>data: String | Finds for a given subscriber in the incoming Rx message |
| ContainsRxSubscriptionId | in : In,<br>type: SubscriptionIdType<br>data: String | Checks for a given subscriber in the incoming Gx message. |
| ContainsRxSubscriptionId | in : In,<br>type: SubscriptionIdType<br>data: String | Checks for a given subscriber in the incoming Rx message. |
| ContainsService | in : In,<br>data: String | Checks if a given service-Id is in the service list of the subscriber profile.<br>Data represents the service-Id to check |
| FindService | in : In,<br>data: String | Finds a given service-Id in the service list of the subscriber profile. |
| ContainsInstalledPolicyProfile | in : In,<br>ruleName: String | Checks if the given rule name exists within the installed Policy rule names. |
| ContainsSpecficAction | in : In,<br>action: SpecificAction | Checks for a given action in the incoming Rx message. |
| ContainsGxEventTrigger | in : In,<br>trigger: EventTrigger | Checks if the given event trigger exists within the incoming Gx message |
| ContainsGxInstalledEventTrigger | in : In,<br>trigger: EventTrigger | Checks if the given event trigger exists within the installed event triggers for session |
| ContainsSubscriberProfileSubscriptionId | in : In,<br>type: SubscriptionIdType<br>data: String | Checks for a given subscriber in the subscriber profile |
| FindSubscriberProfileSubscriptionId | in : In,<br>type: SubscriptionIdType<br>data: String | Finds a given subscriber in the subscriber profile |
| HomezonesContainLocation | in : In,<br>userLocation: HomeZone | Checks if the given userLocation exists in the list of homezones of the subscriber's profile |
| GetCalendarAtHour | hour: Integer | Gets calendar at that hour |
| IsPCCRuleActive (New) | in : In,<br>ruleName: String | Check if the PCC Rule Name is active from the ChargingRuleReports in the incoming message. Checks for both rule & base names |
| getRuleFailureCode (New) | in : In,<br>ruleName: String | Gets the rule failure code from the ChargingRuleReports in the incoming message if not active |
| MatchFromAddress | list: List<PacketFilterInfo>,<br>fromAddress: String | Used to match "from" address in the TFT-Filter/ Packet-Filter-Content from the PacketFilterInfo list. Regex accepted for 'fromAddress' |
| MatchToAddress | list: List<PacketFilterInfo>,<br>toAddress: String | Used to match "to" address in the TFT-Filter/ Packet-Filter-Content from the PacketFilterInfo list. |
| MatchFromPort (New) | list: List<PacketFilterInfo>,<br>fromPort: String | Used to match "from" port in the TFT-Filter/ Packet-Filter-Content from the PacketFilterInfo list. fromPort is one or more ports |
| MatchToPort (New) | list: List<PacketFilterInfo>,<br>toPort: String | Used to match "to" port in the TFT-Filter/ Packet-Filter-Content from the PacketFilterInfo list. toPort is one or more ports |
| MatchProtocol (New) | list: List<PacketFilterInfo>,<br>protocol: String | Used to match "protocol" in the TFT-Filter/ Packet-Filter-Content from the PacketFilterInfo list. |
| MatchDirection (New) | list: List<PacketFilterInfo>,<br>toPort: String | Used to match "direction" in the TFT-Filter/ Packet-Filter-Content from the PacketFilterInfo list. |

EXECUTION FRAMEWORK FOR POLICY MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to a system and method for designing and implementing service policies in a telecommunications network.

BACKGROUND

Operators of telecommunication networks introduce various services and plans for their subscribers which not only define the price, but also the policies for traffic shaping for each of these plans. These policy decisions are based on multiple input factors like the type of the device, the location of the subscriber, his usage counters, type of subscriber (gold/platinum), kind of service being accessed and many others.

Most of the traditional policies are statically defined where they incorporate only a limited number of input factors based on which policy decisions are made. Thus, current policy decisions are limited to checking how much quota the user has used and whether that is below or above a threshold associated with the plan, and then make a decision to either stop further service or downgrade the quality of service.

Additionally, telecommunication networks currently include and/or support several different network types such as traditional circuit-switched telephone networks and more modern IP-based networks. The various legacy communication systems utilize different protocols and a subscriber may have multiple sessions and multiple services running at the same time. However most legacy services have been developed as closed silo applications, meaning they run as a standalone application handling both traffic and administration, making it difficult or impossible to combine inputs from different systems in policy decisions.

Building better policy decision rules for the operator using more and diverse input factors is currently a time consuming and costly exercise because of the current policy solution that the implementation vendors provide. Thus, there is no easy and effective way for operators of telecommunication networks to incorporate such factors into decision making at runtime to effectively manage their network without causing overloads or outages and also provide the best possible user service experience.

SUMMARY

Embodiments of the present invention provide an execution framework which is designed as part of a policy management solution and provides operators the ability to design custom policies using provided building blocks. The execution framework includes the ability to introduce new policy services using a rules engine and dynamically change rule behavior for shaping traffic policies. The execution framework and rules engine allow the operator to define custom policies using a broad range of input factors including, for example, subscriber details, network related triggers, network state, services being accessed, concurrent service access, and the subscriber profile. The custom policies can easily be built using a policy designer and activated in the system for implementation using the execution framework/ rules engine. Customization blocks and/or functions can be plugged in at multiple points while processing the transaction thereby providing multiple decision endpoints. Furthermore, the use of a common profile and the same actor for all sessions of a subscriber allows a network operator to make policy management decisions based on all of subscriber's current sessions. This allows an operator to provide more individual service plans tailored for the specific needs of a subscriber, and to better monetize its existing networks by achieving a better utilization of the network.

Embodiments of the present invention overcome limitations of prior systems which did not allow the operator to dynamically create and introduce such policy rules. Using embodiments of the present invention, the operator may directly and expediently design, introduce and implement new plans, policies, or services which define new traffic shaping policies without requiring the system communication network solution vendor to code such rules in their communications network solution. Using the execution framework described herein, policies can be easily built, customized and activated in the system. The policy designer facilitates policy creation such that the policy designer and rules engine allow same-day creation and deployment of policies.

Further embodiments of the present invention include execution blocks which can easily integrate with other third party systems that the operator wants to integrate with, so that those inputs can be taken into policy decisions. Execution blocks can be executed before or after application of the rules engine. Certain execution blocks may always be part of the execution chain 104 and cannot be modified. However other execution blocks are optional and/or customizable and can be modified and or configured as a part of general system configuration.

The ability to define such dynamic policies enables the operators to introduce new plans and services with a shorter time to market and provides an edge over their competitors. Plans which cater to a wide variety of customers can be introduced, thus increasing the revenues for the operator and providing a better user experience. The operator realizes significant time and cost savings because communication network solution vendors need not be involved in coding simple policy decisions and because integration with third party or legacy systems is streamlined.

In accordance with an embodiment of the invention, a system is provided for dynamically updating policies using customizable execution blocks. The system includes a plurality of interfaces, each operable to receive different subscriber information; an execution framework which includes a plurality of policies, wherein each of the plurality of policies can be dynamically customized using one or more custom execution blocks; and wherein each of the plurality of policies can receive the subscriber information through the plurality of interfaces and execute each policy based on the subscriber information. The method enables a network operator to dynamically update policies using customizable execution blocks and thereby change services associated with a particular policy as well as change the input factors (subscriber location, profile, etc.) available to that policy.

This is advantageous compared to prior systems which used statically defined policies, based on limited input factors.

Other objects and advantages of the present invention will become apparent to those skilled in the art from the following detailed description of the various embodiments, when read in light of the accompanying drawings.

BRIEF DESCRIPTION OF THE DRAWINGS

FIGS. 3A and 3B show aspects of a policy designer in accordance with an embodiment of the invention.

FIG. 4 shows a method for executing a policy charging and rules function in accordance with an embodiment of the invention.

FIGS. 5A-5C show examples of facts available to a policy charging and rules function in accordance with an embodiment of the invention.

FIG. 5D shows examples of rule functions available to a policy charging and rules function in accordance with an embodiment of the invention.

DETAILED DESCRIPTION

Figure 1A:
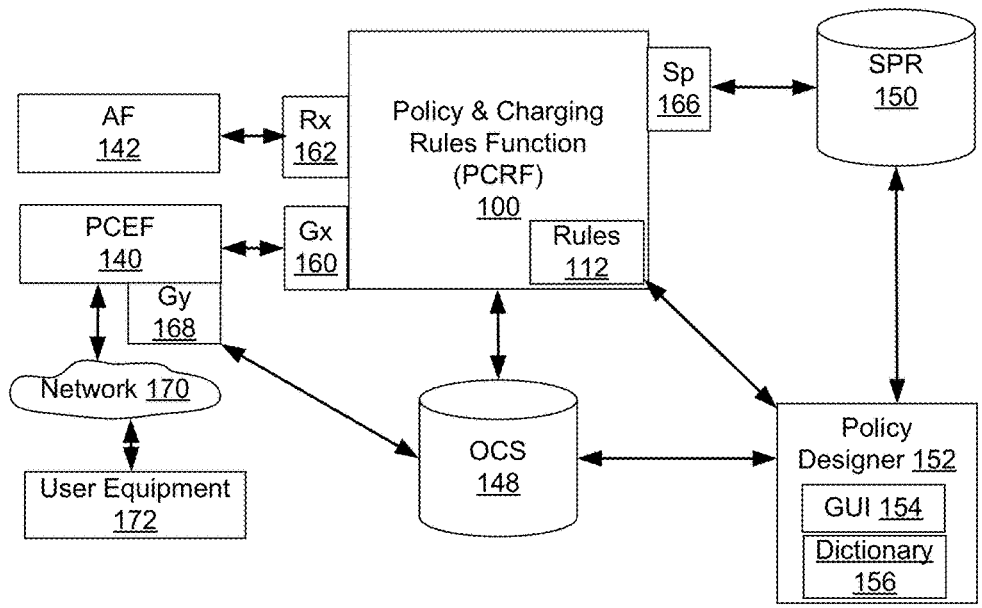
FIGS. 1A, 1B, and 1C show aspects of an execution framework for policy management in accordance with an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears. Likewise the first two digits in a four digit reference numeral.

The present invention provides an execution framework which is designed as part of policy management solution and provides operators the ability to design custom policies using provided building blocks. The execution framework has the ability to introduce new policy services using a rules engine and dynamically change rule behavior for shaping traffic policies. The execution framework and rules engine allow the operator to define custom policies using the a broad range of input factors including, for example, subscriber details, network related triggers, network state, services being accessed, concurrent service access, and the subscriber profile. The custom policies can easily be built using a policy designer and activated in the system for implementation using the execution framework/rules engine. Customization blocks and/or functions can be plugged in at multiple points while processing the transaction thereby providing multiple decision endpoints.

Figure 1B:
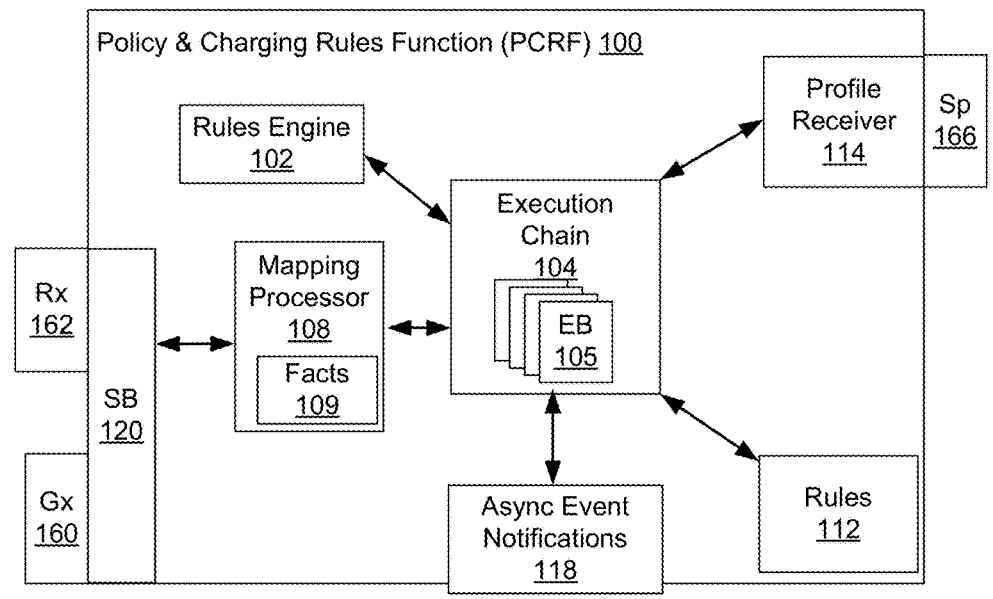

The execution framework is implemented as part of Policy & Charging Rule Function (PCRF) 100 of FIGS. 1A and 1B. PCRF 100 supports policy and charging control decision based on policies, profiles, rules, and session and media related information. PCRF 100 forms a linkage between the service and transport planes of the telecommunications network. PCRF 100 collates subscriber and application data, authorizes Quality of Service (QoS) resources, and instructs the transport plane on how to proceed with the underlying data traffic. PCRF 100 includes a decision engine. PCRF 100 communicates with policy control entities which enforce the bandwidth/QoS restrictions and perform charging. A policy designer 152 allows creation of custom polices using rules dependent on facts exposed to decision making within PCRF 100.

FIG. 1A shows interaction of PCRF 100 with other systems of a telecommunications network. PCRF 100 communicates with other systems of the telecommunication network system using a plurality of Diameter protocol interfaces. Diameter is an authentication, authorization and accounting protocol for computer networks. PCRF 100 is connected on its Diameter protocol Rx interface 162 to the Application Function (AF) 142, an element residing on the service plane. PCRF 100 is connected on its Diameter protocol Sp interface 166 to a subscriber profile repository (SPR) 150. PCRF 100 is connected on its Diameter protocol Gx interface 160 to the Policy and Charging Enforcement Function (PCEF) 140, an element residing on the traffic plane. PCEF 140 also communicates to the Online Charging System (OCS) 148 over the Diameter protocol Gy interface 168 for real time charging of the data session.

Application functions (AF) 142 are the services that the operator provides to subscribers and (generally) charge for. Application functions 142 (AFs) represents applications that require dynamic policy and QoS control over the traffic plane behavior. The Rx interface 162 is used to send media related application information to the PCRF 100 to make decisions to install/update QoS rules.

Policy and Charging Enforcement Function (PCEF) 140 sits between PCRF 100 and the transport plane, i.e. network 170 and user equipment 172. PCEF 140 roles encompass traffic detection and resultant policy enforcement. PCEF 140 is typically located at a gateway node, which varies by transport layer (e.g. a GGSN, PDG etc.). The Gx interface 160 is used to install, modify and remove policy and charging commands and rules between the PCRF 100 and the PCEF 140 in either pull or push modes.

Subscriber profile repository (SPR) 150 provides subscriber specific data to the PCRF 100 over Sp interface 166, to assist in evaluating policy decisions. In an embodiment, SPR 150 provides a representation of subscriber data. The data in SPR 150 specifies the service access preferences and parameters for each subscriber. The information in SPR 150 is intended to supplement the information in an operator's existing subscriber repository or billing system. While existing subscriber repositories contain general account information, the subscriber store contains information specifically relating to the delivery of user-targeted services.

Subscriber profile repository (SPR) 150 includes a flexible data structure for storing subscriber profiles. A profile is created within SPR 150 for each subscriber. The flexible data structure provides a subscriber profile data model which defines the elements of the subscriber profiles. The model includes general information for the subscriber along with feature-specific information, such as policy control data. The subscriber profile can include, for example, activation dates, account type date of birth, notification channel, services, service restrictions, home network, network identifiers, and the like. The subscriber profile model can be extended with service specific attributes.

A policy plan is associated with a few parameters along with a policy control profile and a charging profile. The policy control profile and a charging profile are defined separately and then associated with a policy plan. Thus, policy control profiles and charging profiles can be reused in different policy plans. The operator can, therefore, mix and match policy control and charging profiles. For example, the network operator can define a few charging profiles, and then define multiple plans, each using a separate policy control profile, but using one of the charging profiles already created. Each policy plan has an associated priority level which is used while evaluating the rules. The rules are evaluated in the order of most specific (i.e. highest priority) to least specific (i.e. lowest priority).

Policy designer 152 provides a graphic user interface (GUI) 154 which allows the operator to: create policy profiles; create charging profiles that contain charging information for the services in a policy profile; create QoS profiles that specify, for example, the bandwidth levels that a subscriber is entitled to for a particular policy profile; associate policy profiles with charging profiles and quality of service profiles; and create rules that decide which policy profiles apply to which subscribers. Rules are based on facts. A fact represents a piece of data. In the context of the rules engine, a fact is an asserted instance of a class. Policy designer 152 includes a dictionary 156 of facts 109 exposed within PCRF 100. Dictionary 156 facilitates creation of rules 112. The rules 112 are uploaded to and stored in PCRF 100 for implementation. Policy plans/rules are managed using the GUI 154 of policy designer 152.

FIG. 1B shows the internal architecture and components of PCRF 100. Session Binding Interface (SB) 120 ties together all the sessions on Gx interface 160 and Rx interface 162 related to the subscriber for his individual session. Mapping Processor 108 abstracts out the protocol specific data into facts 109 of the abstraction layer of PCRF 100 for use by the other components. Protocol receiver 114 receives subscriber specific data from SPR 150 on Sp interface 166. Rules engine 102 provides a rules evaluation framework. Async Event Notifications 118 receives XML over HTTP notifications for the various threshold limits set in the billing and revenue management system and passes the notifications to the execution chain 104. Execution chain 104 passes events through a set of pluggable execution blocks (EB) 105 which register for specific events and process the incoming events. Execution blocks 105 allow easy integration with other third party systems that the operator wants to integrate with for data/inputs or actions/outputs.

PCRF 100 includes rules 112 which can be provided for example by policy designer 152. A rule 112 has two parts: an IF section and a THEN section. The IF section contains a condition based on the evaluation of data from various sources. The THEN section contains actions that can be performed. If the condition in the IF section evaluates to true, the rule 112 performs the actions in the THEN section. The actions usually involve dynamically applying a policy profile to a subscriber or removing a policy profile from a subscriber, but they may involve other actions as well. Actions can include, for example, asserting a new fact 109, modifying a data value, and/or retracting a fact 109. Rules 112 are based on facts 109 which represent pieces of exposed data. A rule 112 can change network behavior based on, for example, a subscriber's current location, credit status, connectivity access, network changes, and so on.

Rules engine 102 provides a rules evaluation framework for evaluating rules 112. PCRF 100 utilizes deep packet inspection (DPI) and exposes a wide variety of network, subscriber, and event data to decision making (facts 109). Rules engine 102 can reevaluate rules 112 as a session progresses and subscribers consume services (see, e.g. box 210 of FIG. 2). PCRF 100 thus allows reinterpreting the rules as the service flow continues and the input data, such as the approach of a resource limit, changes.

Facts 109 are the basis for rules 112. Facts 109 represent pieces of exposed data (see FIGS. 5A-5C). In the context of the rules engine 102, a fact 109 is an asserted instance of a class and has a type and a value. Facts 109 include application and media information from the AF 142; internal rule configurations (other policy profiles); subscriber information from the SPR 150; and information such as event triggers from the PCEF 140. Mapping processor 108 can abstract facts 109 from information provided over interfaces of PCRF 100 including, for example, Rx interface 162 and Gx interface 160 (see FIG. 1B). Event triggers from PCEF 140 are also often used as input.

The large and diverse exposure of events and inputs (facts 109) in PCRF 100 (see FIGS. 5A-5C), allows great flexibility in rules 112 (see FIG. 5D). Thus, rules evaluated by rules engine 102 can control subscriber QoS based on factors such as: subscriber ID; service contract; content (for example, type of data such as video download or voice conversation); time-of-day; timezone; location (for example, local or roaming); type of user equipment (for example, some devices are allowed and others not, some devices require more bandwidth than others); access network type; life cycle state (for example an operator might degrade service for subscribers with suspended accounts); a subscriber's current location, credit status, connectivity access, network changes, and so on.

PCRF 100 supports adding of multiple execution blocks 105 in the execution chain 104 which can implement various procedures and also provides a way to add customizations. The execution chain 104 passes messages/events through the set of pluggable execution blocks 105 which register for specific events and process the incoming events. In an embodiment of the invention, each execution block 105 registers with the following fields: Application-Id; Message Type (Initial, Update or Term); Request Type (Is it Request or Answer); Command-Ids; Class Name; Precedence; and Active (Y/N). Execution chain 104 can provide validations and/or fetch additional data required for the call-flow. Execution blocks can also provide access to services for execution of functions—for example sending an SMS to a subscriber in the event that a rule is satisfied. Execution blocks 105 may include, for example, a ProfileDownloaderBlock, PCCRuleValidatorBlock, RuleCollision ResolverBlock, and StatisticUpdaterBlock, etc. Execution blocks 105 can be executed before or after application of the rules engine 102. Certain execution blocks 105 will always be part of the execution chain 104 and cannot be modified. However many execution blocks 105 are optional and/or customizable and can be modified and or configured as a part of general system configuration.

Figure 1C:
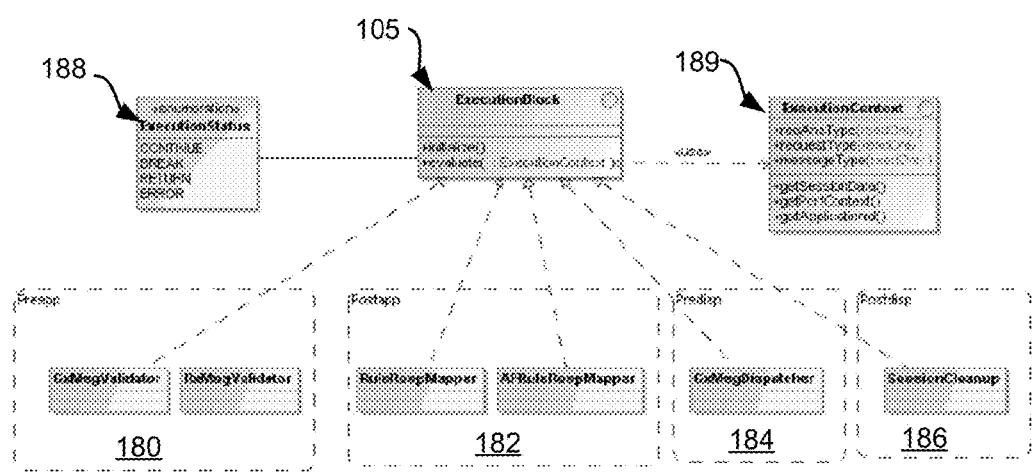

FIG. 1C, illustrates features of execution blocks 105 and execution chain 104. Execution blocks 105 specify an execution status 188 and execution context 189. Each execution block 105 registers itself with certain criteria which are validated against the input events to decide if the execution block should be executed or not. Each execution block 105 registers itself with the following fields, for example: Application-Id; Message Type (Initial, Update or Term); Request Type (Is it Request or Answer); Command-Ids; Class Name; Precedence; Active (Y/N). As shown in FIG. 1C, an execution block 105 can be implemented before an application 180, post application 182, before disposition 184, or after disposition 186. Each execution block 105 has a priority level relative to its group and it will be executed in that order.

Figure 2:
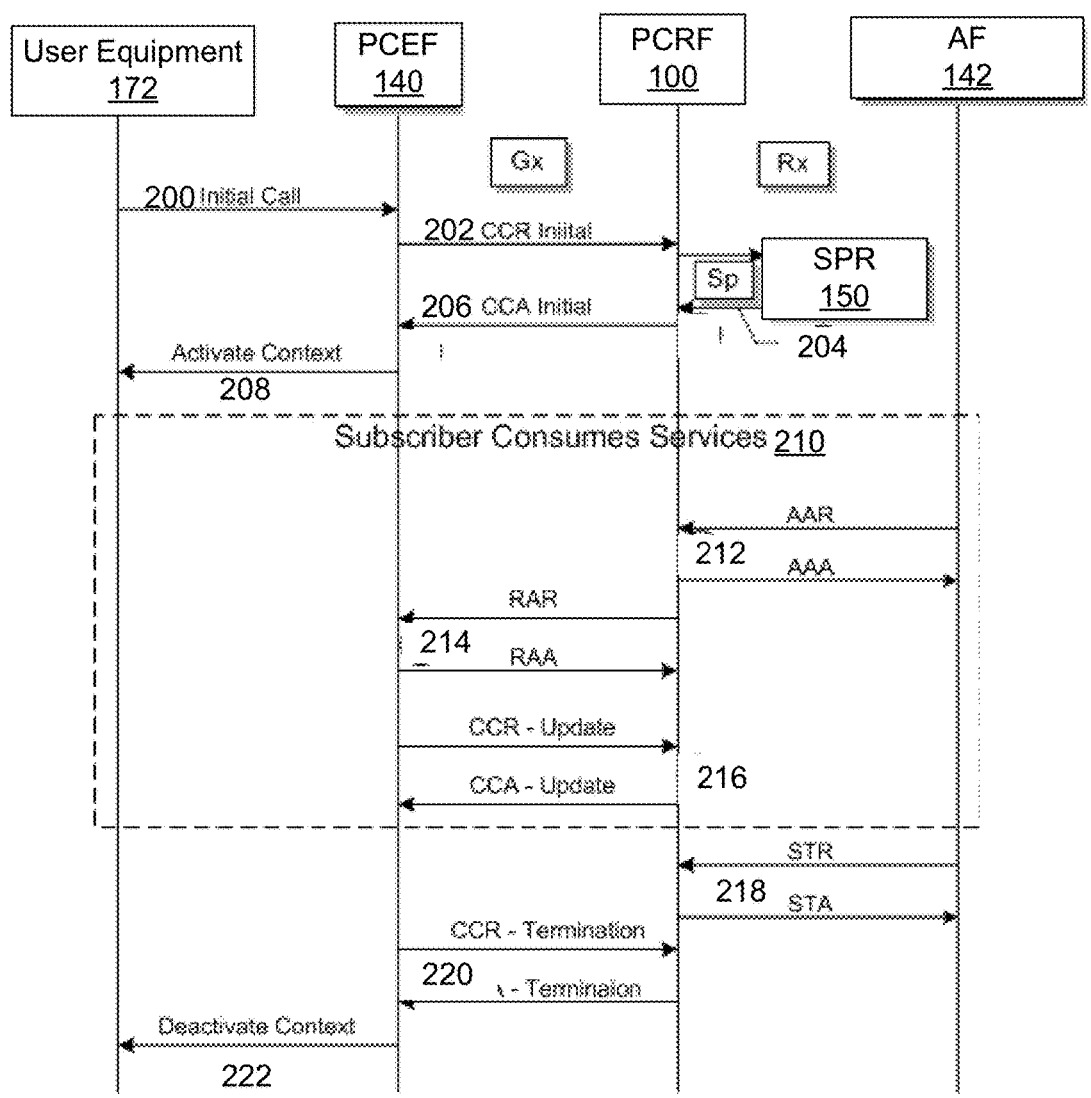
FIG. 2 shows routing and flow in an execution framework for policy management in accordance with an embodiment of the invention.

FIG. 2 shows a typical call flow using PCRF 100. As shown in FIG. 2, at 200 user equipment 172 initiates a call for service. At 202, the call is processed through PCEF 140 and transmitted to PCRF 100 over the Gx interface 160. At 204 PCRF 100 downloads subscriber profile data from subscriber profile repository 150 over Sp interface 166 and evaluates the rules provided in the subscriber profile. PCRF 100 can evaluate rules using rules engine 102 and execution of one or more execution blocks 105 in the execution chain 104 (see FIG. 1B). Rules can be session-based or event-based. Control by PCRF 100 is based on deep packet inspection (DPI) and exposes a wide variety of network, subscriber, and event data to decision making. The PCRF generates policy decisions as an outcome of the rule engine and the execution blocks. In response to policy decisions the PCRF installs/uploads policy information to the PCEF for implementation. At 206 PCRF 100 transmits the initial rules to PCEF 140. At 208, PCEF 140 enforces the rules and activates the context for the service.

As shown in FIG. 2, box 210 illustrates flow during consumption of the services by the subscriber (i.e. a session utilizing an application function 142). PCRF 100 can update rule/policy decisions during the session as the data flow itself causes conditions change and new rules and QoS levels to apply. This can include evaluation of rules by rules engine 102 and execution of one or more execution blocks 105 in the execution chain 104 (see FIG. 1B). For example, at 212, application function 142 updates PCRF 100 with data regarding application and media consumption. Thus, at 214 PCRF 100 may provide updated rules to PCEF 140 during consumption of media and PCEF 140 can enforce the updated rules. At 216, PCEF 140 can report events and consumption to PCRF 100 for application of updated rules. At 218 the application function 142 is terminated and the application function 142 reports to PCRF 100. At 220, PCRF 100 communicates with PCEF 140. At 222, PCEF 140 disconnects the session.

FIGS. 3A and 3B, show aspects of the graphic user interface (GUI) 154 of policy designer 152. Policy designer 152, allow the operator to create policy and charging profiles that set bandwidth limits and charging instructions. In general, an operator can use GUI 154 to graphically specify the charging and policy rules for different products. The rules define how broadband resources are allocated among subscribers, and what the operator will charge for them. Policy designer 152 also allows the operator to create rules that PCRF 100 uses to select broadband policies for the subscribers. These rules define how broadband resources are allocated among subscribers, and under what conditions. The policy designer 152 facilitates the creation of highly-customized pricing plans for services based on guaranteed maximum and minimum bandwidth levels. The operator can change these offerings quickly, and also offer targeted promotions customized to individual subscribers (such as a deal on their birthday).

Referring to FIG. 3A, policy designer 152 includes a deployments function 330. Using deployments function 330, the operator can view, edit and delete currently deployed policies, profiles and rules, and deploy new or changed policies, profiles and rules to the PCRF. The operator may thereby expediently design, introduce and implement new plans, policies, or services which define new traffic shaping policies without requiring the vendor to define such rules in their communications network solution.

Referring again to FIG. 3A, policy designer 152 includes a profile editor function 310. Using profile editor function 310, the operator can create, edit and delete polices in the policies function 312; can create, edit, and delete, charging profiles in the charging function 314; and can create, edit, and delete QoS profiles in the quality of service function 316. The policies function 312 of profile editor function 310 shows the policy profiles listed by name in the column on the left, and columns on the right list the charging profiles and quality of service profiles that each policy profile is associated with.

Referring to FIG. 3B, policy designer 152, includes a rule editor function 320. Once the operator has created profiles that correspond to products, the operator creates rules which determine which subscribers are entitled to those policies (products) and under what circumstances. Using rule editor function 320, an operator can create rules that select (or reselect) policy profiles. The rules are tests to decide whether a subscriber is entitled to the bandwidth capabilities and limits in a specific policy profile. Rules can be session-based or event-based. Using policy designer 152, rules can be added, modified, and deleted whenever required and can also be activated and deactivated individually.

The rule editor function 320 of policy designer 152 contains an extensive dictionary of facts 109 (see FIG. 1B) which represent the diverse data and functions exposed within PCRF 100 from which the operator can select to create rules. The large and diverse exposure of facts 109 allows great flexibility in rule design and operation. Thus, rules can be written to control subscriber QoS based on factors such as: subscriber ID; service contract; content (for example, type of data such as video download or voice conversation); time-of-day; timezone; location (for example, local or roaming); type of user equipment (for example, some devices are allowed and others not, some devices require more bandwidth than others); access network type; life cycle state (for example an operator might degrade service for subscribers with suspended accounts); a subscriber's current location, credit status, connectivity access, network changes, and so on. For example, using rule editor function 320, the operator can create rules that change behavior based on, for example, a subscriber's current location, credit status, connectivity access, network changes, and so on. Also, rules can be written to provide service data flow traffic gating. The operator can, for example, allow or disallow certain kinds of service data flow based on its origin.

FIG. 4 shows a method for executing a policy charging and rules function in accordance with an embodiment of the invention. In an initial step 402 a plurality of policies are provided. The policies can be created using, for example the policy designer. The policies are associated with charging profiles that set bandwidth limits and charging instructions, and rules which define how broadband resources are allocated among subscribers, and under what conditions. In an embodiment of the invention, the policies and rules can be dynamically updated using the policy designer (see, e.g. FIGS. 3A, 3B and accompanying text). In another initial step, 404, one or more customizable execution blocks are provided. The execution blocks are designed to facilitate implementation of various procedures and provide a way to add customizations (see FIG. 1B and accompanying text. Steps 402, and 404 are performed during system setup, however they can also be performed during runtime to dynamically update policies, rules, and/or execution blocks.

During runtime operation, at step 406, the method includes receiving subscriber information pertaining to a subscriber through a plurality of interfaces. As described above, PCRF 100 receives subscriber information pertaining to a subscriber through a plurality of Diameter interfaces such as the Rx interface 162, Gx interface 160, and Sp interface 166 (see FIGS. 1A-1C and accompanying text). At step 408, a plurality of facts is abstracted from the subscriber information (see facts 109 of FIG. 1B). In PCRF 100, mapping processor 108 is responsible for abstracting facts 109 from the information content on the various interface into the framework for use in internal processes of PCRF 100 (see, FIG. 1B). At step 410, the subscriber profile is accessed in order, for example, to identify the policies and rules applicable to a particular subscriber. For example, PCRF 100 accesses subscriber profile repository 150 over the Sp Diameter interface 166 (see FIG. 1A). At step 412, one or more polices (including rules) applicable to the particular subscriber are identified from the subscriber profile. At optional step 414*a*, one or more execution blocks is initiated. At step 416, the rules engine is used to evaluate rules applicable to the subscriber in light of the facts pertaining to the subscriber. At optional step 414*b*, one or more execution blocks is initiated. At step 418, in response to actions of the rules engine and/or execution blocks, policy and charging control decisions for said subscriber are generated for the policies applicable to said subscriber by PCRF 100. At step 420, the policy charging and control decision are enforced, for example by PCEF 140 (see FIG. 1A).

EXAMPLES

Facts and rules are used in the implementation of policies as described above. FIGS. 5A-5D show examples of the type and breadth of parameters exposed within PCRF 100 as facts 109 upon which rules engine 102 can operate (see FIGS. 1A and 1B). FIG. 5A shows a table 500 of parameters 502 of the Gx interface 160. FIG. 5B shows a table 510 of parameters 512 of the Rx interface 162. FIG. 5C shows a table 520 of common parameters 522 which are derived from the parameters in tables 500 or 510 or from other parts of the system. FIG. 5D shows a table 530 of rule function 532 which are exposed to a developer. The exposure of a broad and diverse variety of parameters as facts allows specific tailoring of policies to customer needs. Examples of policies include the following.

Example 1

A network server provides an FTP service. The FTP server supports both the active (separate ports for control and data) and passive modes of operation. A policy charging control rule is configured for the service data flows associated with the FTP server for the user. The policy charging control rule uses a filter specification for the uplink that identifies packets sent to port 20 or 21 of the IP address of the server, and the origination information is wildcarded. In the downlink direction, the filter specification identifies packets sent from port 20 or 21 of the IP address of the server.

Example 2

A network server provides a "web" service. A policy charging control rule is configured for the service data flows associated with the HTTP server for the user. The policy charging control rule uses a filter specification for the uplink that identifies packets sent to port 80 of the IP address of the server, and the origination information is wildcarded. In the downlink direction, the filter specification identifies packets sent from port 80 of the IP address of the server.

Example 3

The same server provides a WAP service. The server has multiple IP addresses, and the IP address of the WAP server is different from the IP address of the web server. The policy charging control rule uses the same filter specification as for the web server, but with the IP addresses for the WAP server only.

Example 4

An operator offers a zero rating for network provided DNS service. A policy charging control rule is established setting all DNS traffic to/from the operators DNS servers as offline charged. The data flow filter identifies the DNS port number, and the source/destination address within the subnet range allocated to the operators network nodes.

Example 5

An operator has a specific charging rate for user-user VoIP traffic over the IMS. A policy charging control rule is established for this service data flow. The filter information to identify the specific service data flow for the user-user traffic is provided by the P CSCF (AF).

The functionality provided by PCRF 100 enables creation of plans such as, for example, for example: a first fixed price service plan which offers unlimited talk, text, Web browsing; a second fixed price service plan which includes the same unlimited talk, text, Web services as the first fixed price service plan and additional features including international and premium text messaging, corporate e-mail and 1 GB of additional data access, with premium features when connected via Wi-Fi, including audio capabilities to listen and download music and access to preview and trial video content; and a third fixed price service plan which provides the same premium features as the second fixed price service plan, plus unlimited data access and premium content such as video-on-demand channels and audio downloads.

Following are some of the examples of the Rules that are created using the GUI 154 of the policy designer 152 (see FIG. 1A).

Example 6

Credit Expiry & Reallocation: Subscriber is accessing 3G data services and special QOS policy is applied for these services. When the subscriber runs out of credit, QOS is throttled and limited access is provided. When the subscriber recharges his account, original QOS applies again.

Example 7

Prepaid Facebook Plan: Prepaid Subscribers get free Facebook access. The policy charging control profile (Prepaid_Facebook_Plan) is configured with Charging Profile to indicate the free access.

Example 8

Mobile TV access: Subscribers accessing MobileTV service are guaranteed a certain minimum bandwidth. The AF indicates if the service being accessed is "MobileTV" and appropriate policy charging control profile is applied.

Example 9

Subscriber Promotions: Subscribers configured with Global attributes such as company name and PCRF specific attributes with a coupon code gets promotional QOS and some discounts.

Example 10

HomeZone discount: Subscribers accessing data services in their Home Zone are charged at discounted rates via ongoing promotion.

The present invention may be conveniently implemented using one or more conventional general purpose or specialized digital computer, computing device, machine, or microprocessor, and/or network of same, programmed according to the teachings of the present disclosure.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for policy management in a telecommunication network operating, the system operating on one or more microprocessors and comprising:
   a plurality of interfaces, each operable to receive subscriber information pertaining to a subscriber;
   a mapping processor for abstracting a plurality of facts from the subscriber information;
   a plurality of policies for generating policy and charging control decisions for subscribers, wherein each of the plurality of policies includes one or more rules dependent upon said plurality of facts, wherein said plurality of facts include, subscriber profile, network triggers, network state, service accessed, and concurrent services accessed;
   a subscriber profile repository which includes a subscriber profile which identifies one or more of said policies applicable to said subscriber;
   a rules engine which generates policy and charging control decisions for said subscriber based on said one or more policies applicable to said subscriber by evaluating a plurality of rules or customized rules included in said one or more of said plurality of policies in view of said plurality of facts; and
   a policy designer configured to enable dynamic customization of said plurality of policies by an operator of said telecommunication network to include customized rules dependent upon each of said plurality of facts.

2. The system of claim 1, further comprising:
   a plurality of customizable execution blocks which register for specific events and execute functions in response to said specific events occurring; and
   an execution chain which passes events through the plurality of customizable execution blocks.

3. The system of claim 1, wherein said policy designer comprises a graphical user interface adapted to allow an operator of said telecommunication network to dynamically customize said plurality of policies.

4. The system of claim 1, further comprising a policy and charging enforcement system which is provided with policy information in response to said policy charging control decisions generated by said rules engine.

5. The system of claim 1, further comprising:
   a plurality of customizable execution blocks for executing functions in response to one or more of said plurality of facts; and
   an execution chain which initiates one or more of said execution blocks in response to said facts.

6. The system of claim 1, further comprising:
   a plurality of customizable execution blocks for executing functions in response to one or more of said plurality of facts;
   an execution chain which initiates one or more of said execution blocks in response to said one or more of said plurality of facts;
   wherein one or more of said execution blocks are executed in response to said one or more of said plurality of facts prior to said rules engine and one or more of said execution blocks are executed in response to to said one or more of said plurality of facts after said rules engine.

7. The system of claim 1, further comprising:
   a rules designer comprising a graphic user interface wherein the graphic user interface permits an operator to design policies and rules operative on one or more of said plurality of facts and deploy said rules and policies; and wherein the rules designer includes a dictionary of said plurality of facts selectable by the operator during design of policies and rules.

8. A method for policy management in a telecommunication network operating, the method operating on one or more microprocessors and comprising:
receiving subscriber information pertaining to a subscriber through a plurality of interfaces;
abstracting a plurality of facts from the subscriber information, wherein said plurality of facts include, subscriber profile, network triggers, network state, service accessed, and concurrent services accessed;
providing a plurality of policies for generating policy and charging control decisions for subscribers, wherein each of the plurality of policies includes one or more rules dependent upon one or more of said plurality of facts;
providing a policy designer configured to enable dynamic customization of said plurality of policies by an operator of said telecommunications network to include customized rules dependent upon each of said plurality of facts;
identifying, from a subscriber profile, one or more of said plurality of policies applicable to said subscriber; and
generating policy and charging control decisions for said subscriber based on said one or more of said plurality of policies applicable to said subscriber by evaluating rules or customized rules included in said one or more of said plurality of policies in view of said plurality of facts.

9. The method of claim 8, wherein providing a plurality of policies includes designing one or more of said policies using said policy designer.

10. The method of claim 8, wherein providing a plurality of policies includes designing one or more of said policies using a policy designer including a graphical user interface adapted to allow an operator of said telecommunication network to dynamically customize said plurality of policies.

11. The method of claim 8, further comprising:
providing policy information to a policy and charging enforcement system in response to said policy charging control decisions generated by said rules engine.

12. The method of claim 8, further comprising:
providing a plurality of customizable execution blocks for executing functions in response to one or more of said plurality of facts, and initiating one or more of said execution blocks in response to said one or more of said plurality of facts.

13. The method of claim 8, further comprising:
providing a plurality of customizable execution blocks for executing functions in response to one or more of said plurality of facts, and initiating one or more of said execution blocks in response to said one or more of said plurality of facts wherein one or more of said execution blocks are executed prior to said rules engine and one or more of said execution blocks are executed after said rules engine.

14. The method of claim 8, wherein providing a plurality of policies includes designing one or more of said policies using a policy designer including a graphical user interface adapted to allow an operator of said telecommunication network to dynamically customize said plurality of policies and deploying said one or more of said policies.

15. A non-transitory computer readable storage medium including instructions stored thereon for supporting policy management in a telecommunication network, which instructions, when executed by a computer, cause the computer to perform steps comprising:
receiving subscriber information pertaining to a subscriber through a plurality of interfaces;
abstracting a plurality of facts from the subscriber information, wherein said plurality of facts include, subscriber profile, network triggers, network state, service accessed, and concurrent services accessed;
providing a plurality of policies for generating policy and charging control decisions for subscribers, wherein each of the plurality of policies includes one or more rules dependent upon one or more of said plurality of facts;
providing a policy designer configured to enable dynamic customization of said plurality of policies by an operator of said telecommunications network to include customized rules dependent upon each of said plurality of facts;
identifying, from a subscriber profile, one or more of said plurality of policies applicable to said subscriber; and
generating policy and charging control decisions for said subscriber based on said one or more of said plurality of policies applicable to said subscriber by evaluating rules or customized rules included of said one or more of said plurality of policies in view of said plurality of facts.

16. The non-transitory computer readable storage medium of claim 15, wherein the steps further comprise designing one or more of said policies using said policy designer.

17. The non-transitory computer readable storage medium of claim 15, wherein said policy designer comprises a graphical user interface adapted to allow an operator of said telecommunication network to dynamically customize said plurality of policies.

18. The non-transitory computer readable storage medium of claim 15, wherein the steps further comprise providing policy information to a policy and charging enforcement system in response to said policy charging control decisions generated by said rules engine.

19. The non-transitory computer readable storage medium of claim 15, wherein the steps further comprise providing a plurality of customizable execution blocks for executing functions in response to one or more of said plurality of facts, and initiating one or more of said execution blocks in response to said one or more of said plurality of facts.

20. The non-transitory computer readable storage medium of claim 15, wherein the steps further comprise providing a plurality of customizable execution blocks for executing functions in response to one or more of said plurality of facts, and initiating one or more of said execution blocks in response to said one or more of said plurality of facts wherein one or more of said execution blocks are executed prior to said rules engine and one or more of said execution blocks are executed after said rules engine.

* * * * *

UNITED STATES PATENT AND TRADEMARK OFFICE
CERTIFICATE OF CORRECTION

PATENT NO. : 9,654,299 B2
APPLICATION NO. : 13/622520
DATED : May 16, 2017
INVENTOR(S) : Shinde et al.

Page 1 of 1

It is certified that error appears in the above-identified patent and that said Letters Patent is hereby corrected as shown below:

In the Specification

In Column 2, Line 41, delete "and or" and insert -- and/or --, therefor.

In Column 3, Line 62, delete "the a" and insert -- a --, therefor.

In Column 6, Line 62, delete "and or" and insert -- and/or --, therefor.

In the Claims

In Column 12, Line 60, in Claim 6, delete "to to" and insert -- to --, therefor.

In Column 14, Line 30, in Claim 15, delete "included of" and insert -- included in --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*